United States Patent [19]

Wilson

[11] Patent Number: 5,361,311
[45] Date of Patent: Nov. 1, 1994

[54] AUTOMATED RECONGITION OF CHARACTERS USING OPTICAL FILTERING WITH POSITIVE AND NEGATIVE FUNCTIONS ENCODING PATTERN AND RELEVANCE INFORMATION

[75] Inventor: Charles L. Wilson, Darnestown, Md.

[73] Assignee: The United States of America as represented by the Secretary of Commerce, Washington, D.C.

[21] Appl. No.: 913,010

[22] Filed: Jul. 14, 1992

[51] Int. Cl.$^5$ .............................................. G06K 9/00
[52] U.S. Cl. ......................................... 382/32; 382/15
[58] Field of Search ........................ 382/32, 34, 35, 14, 382/15

[56] References Cited

U.S. PATENT DOCUMENTS

| | | | |
|---|---|---|---|
| 3,182,290 | 5/1965 | Rabinow | 382/43 |
| 3,197,735 | 7/1965 | Haynes et al. | 382/32 |
| 3,810,093 | 5/1974 | Yasuda et al. | 382/35 |
| 3,879,605 | 4/1975 | Carl et al. | 324/77 |
| 4,082,431 | 4/1978 | Ward, III | 364/515 |
| 4,590,608 | 5/1986 | Chen et al. | 382/43 |
| 4,783,830 | 11/1988 | Johnson et al. | 382/34 |
| 4,854,669 | 8/1989 | Birnbach et al. | 382/43 |
| 4,989,257 | 1/1991 | Horowitz | 382/18 |
| 4,998,286 | 3/1991 | Tsujiuchi et al. | 382/34 |
| 5,014,327 | 5/1991 | Potter et al. | 382/34 |
| 5,047,968 | 9/1991 | Carrington et al. | 364/572 |
| 5,050,220 | 9/1991 | Marsh et al. | 382/31 |

OTHER PUBLICATIONS

Uncertainty relation for resolution in space, spatial frequency, and Orientation Optimized by Two-dimensional Visual Cortical Filters, pp. 1160–1169 Daugman, Havard University, J. Opt. Soc. Am. A/vol. 2 No. 7/Jul. 1985.

Complete Discrete 2-D Gabor Transforms by Neural Networks for Image Analysis and Compression, Daughman, IEEE Transactions on Acoustics, Speech and Signal Processing vol. 36, No. 7, Jul. 1988, pp. 1169–1179.

Winner-Take-All Network of O(N) Complexity, Advances in New Information Processing Systems 1, Ed. D. S. Touretzky, 1989, pp. 703–711.

Karhunen Loeve Feature Extraction For Neural Handwritten Character Recognition, Patrick J. Grother, Image Recognition Group NIST, SPIE, vol. 1709, Apr. 1992, pp. 1–11.

Training Feed Forward Neural Networks Using Conjugate Gradients, Grother et al, U.S. Department of Commerce NIST, NISTIR 4776, Feb. 1992, pp. 1–22.

Massively Parelel Implementation of Character Recog- (List continued on next page.)

Primary Examiner—David K. Moore
Attorney, Agent, or Firm—Michael M. de Angeli

[57] ABSTRACT

A method and apparatus is described for recognition of hand printed characters using pairs of positive and negative correlative functions (PNCFs), the PNCFs including both pattern and relevance information, implemented by optical elements. A set of optical elements having varying optical density corresponding to a set of two-dimensional PNCFs is generated. A pattern of illumination responsive to the image of the character to be identified is simultaneously transmitted through each of the optical elements implementing the PNCFs. The amount of light transmitted through each of the elements is measured, providing a transmission coefficient. The transmission coefficients are the inputs to a neural network, such that the inputs to the neural network are a set of transmission coefficients resulting from transmission of light corresponding to a character to be identified through a complete set of optical elements implementing a set of PNCFs. The neural network calculates weighted sums of the transmission coefficients. The neural network may be implemented as a network of resistors connected between input nodes, intermediate nodes, and output nodes. The output node having the highest voltage identifies the character to be identified.

21 Claims, 2 Drawing Sheets

OTHER PUBLICATIONS nition Systems Garris et al, U.S. Department of Commerce NIST, NISTIR 4750, Jan. 1992, pp. 1–12.

Self–Organizing Neural Network Character Recongition on a Massively Parallel Computer, Wilson et al, NIST, International Joint Conference on Neural Networks, Proceeding, II, pp. 325–329, Jun. 1990, San Diego, Calif.

Analysis of a Biologically Motivated Neural Network for Character Recognition, Garris et al, NIST, Proceedings: Analysis of Neural Network Applications, ACM Press, George Mason University, May 1991, pp. 160–175.

Methods for Enhancing Neural Network Handwritten Character Recognition, Garris et al, NIST, International Joint Conference on Neural Networks, vol. 1, IEEE, Seattle, Jul. 1991, pp. I–695—I–700.

Faust: A vision–based Neural Network Multi-map Pattern Recognition Architecture, Wilson, U.S. Department of Commerce, NIST, NISTIR 4805 Mar. 1992, pp. 1–16.

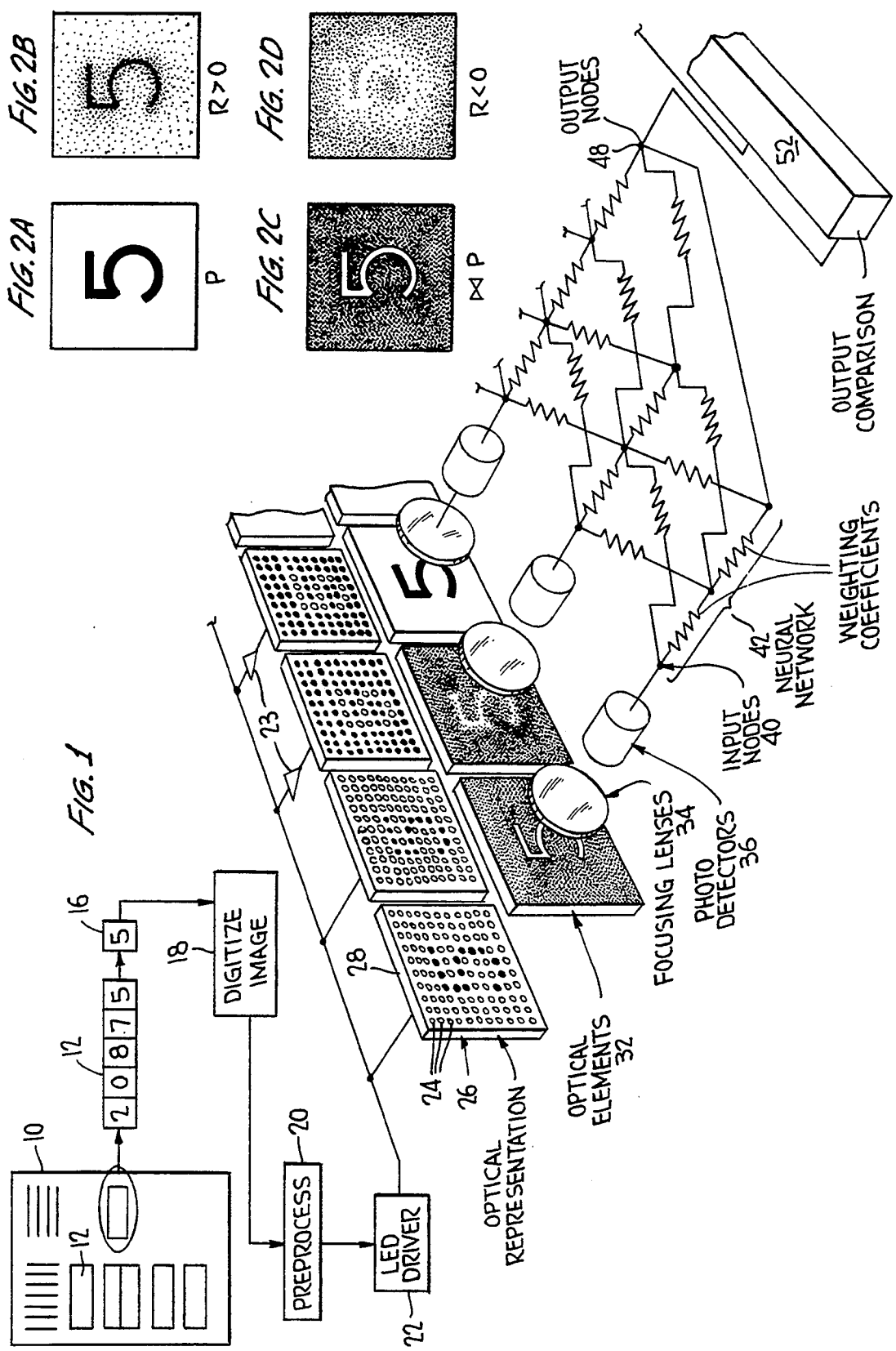

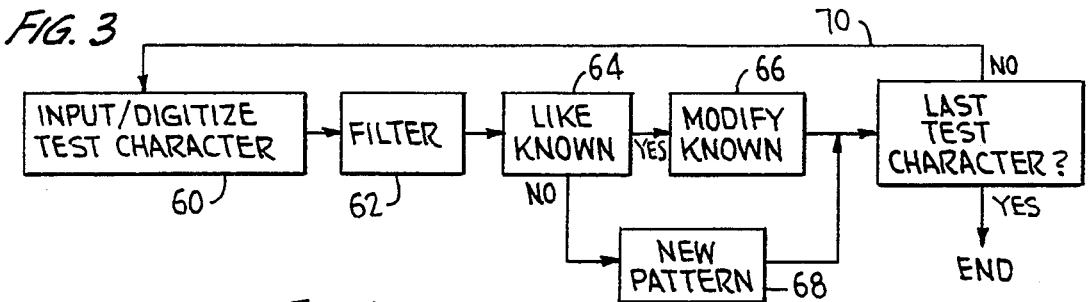
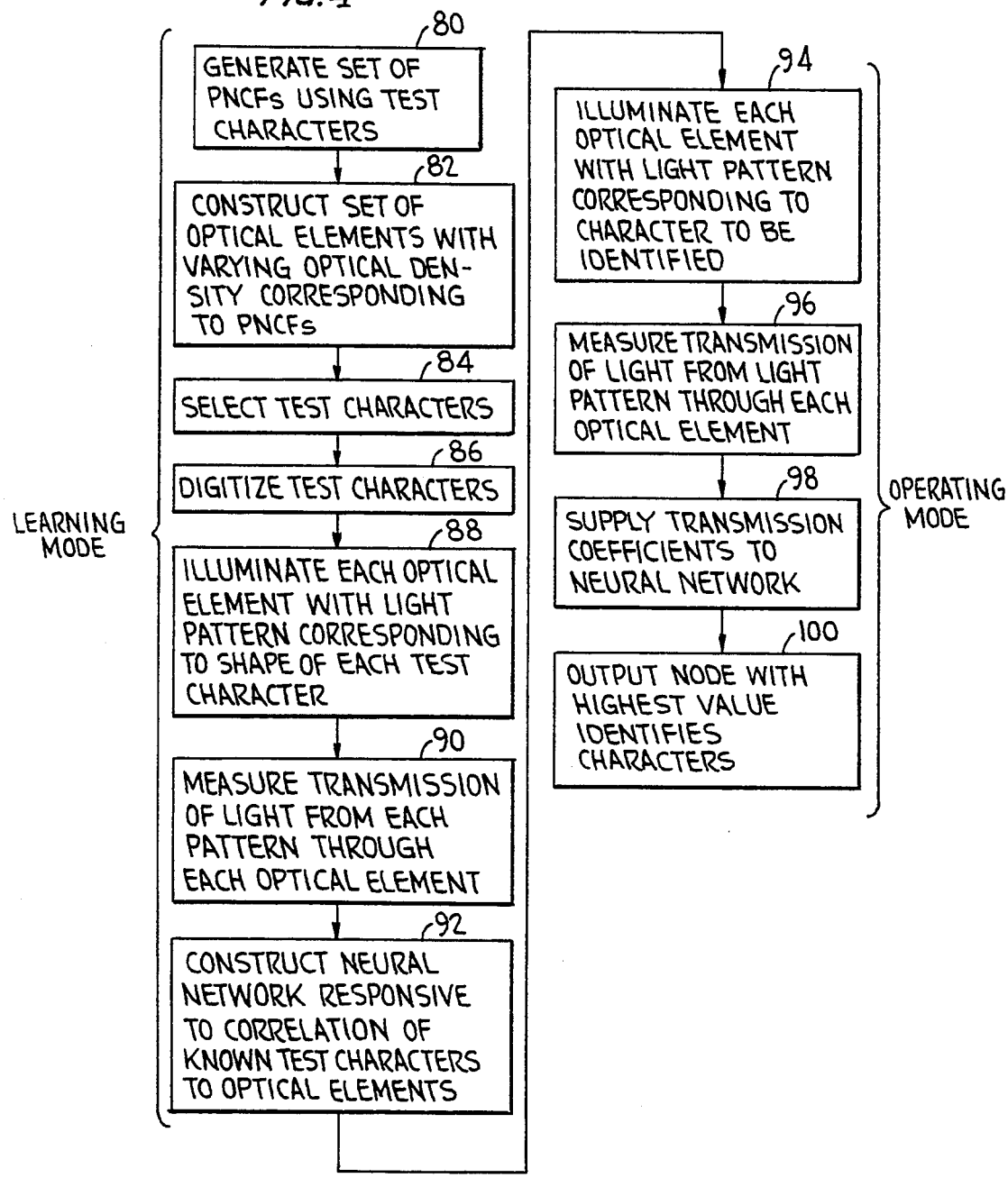

AUTOMATED RECOGNITION OF CHARACTERS USING OPTICAL FILTERING WITH POSITIVE AND NEGATIVE FUNCTIONS ENCODING PATTERN AND RELEVANCE INFORMATION

BACKGROUND OF THE INVENTION

1. Field of the Invention

This invention relates to optical character recognition. More particularly, this invention relates to methods and apparatus for recognizing characters printed by hand or machine with high accuracy and speed at relatively low cost.

2. Discussion of the Prior Art

It is conservatively estimated that the data input segment of the data processing industry is a $25 billion per year business. A character recognition device saving half this cost would accordingly save more than $10 billion a year. Consequently, there has been for many years very substantial interest in automatic recognition of characters. Recent years have seen substantial success in recognition of machine-printed characters, e.g., typed or computer printed characters, and useful equipment is now commercially available. However, a vast amount of data is still collected by hand, e.g., on census forms, tax forms, hand printed envelopes and the like. It would be highly advantages if similar equipment could be developed for recognizing hand printed characters.

Relevant work done previously by the inventors and co-workers is reported in a number of papers, as follows: "Self-Organizing Neural Network Character Recognition on a Massively Parallel Computer", Wilson et al, *Proceedings of International Joint Conference on Neural Networks*, II, pp. 325-329, Jun. 18, 1990; "Analysis of a Biologically Motivated Neural Network for Character Recognition", Garris et al, in *Proceedings: Analysis of Neural Network Applications*, ACM Press, George Mason University, May 1991; "Methods for Enhancing Neural Network Handwritten Character Recognition", Garris et al, *International Joint Conference on Neural Networks, Volume I*, IEEE, July 1991; "Massively Parallel Implementation of Character Recognition Systems", Garris et al, report NISTIR 4750 published by the U.S. Department of Commerce (1992); and "Training Feed Forward Neural Networks Using Conjugate Gradients", Grother et al, report NISTIR 4776 published by the U.S. Department of Commerce (1992).

Each of these reports relates to use of digital processing systems for recognizing hand printed characters using Gabor functions. Gabor functions were proposed by Dennis Gabor in 1946. The great utility of Gabor functions in recognition of characters and related image processing functions are discussed by Daugman in "Uncertainty relation for resolution in space, spatial frequency, and orientation optimized by two-dimensional visual cortical filters", *J. Opt. Soc. Am. A., Volume* 2, No 7, July, 1985 and in "Complete Discrete 2-D Gabor Transforms by Neural Networks for Image Analysis and Compression", *IEEE Transactions on Acoustics, Speech and Signal Processing*, Volume 36, No. 7, July, 1988.

A further set of functions useful in image and specifically character recognition may be derived using Karhunen Loeve ("K-L") transforms. See Grother, "Karhunen Loeve Feature Extraction for Neural Handwritten Character Recognition", *SPIE*, Vol 1709 (April 1992). Functions derived from K-L transforms are similar to Gabor functions in that both encode both frequency and spatial information in an image employing a limited set of functions. That is, when either Gabor or K-L derived functions are correlated with an image, the resulting value is proportional to similarity of the frequency and spatial content of the image and of the function.

An important distinction between processes for image recognition employing Gabor functions and K-L derived functions lies in the method whereby the functions are derived. Gabor functions are derived a priori, that is, by mathematical calculation based on one or more of an infinite set of equations proposed by Gabor. See the May 1991 *Proceedings: Analysis of Neural Networks Applications* paper of Garris et al, supra. K-L transforms, by comparison, are derived only through correlation of a large sample of actual images of, e.g., the characters to be recognized. See the 1992 Grother *SPIE* paper, supra. Thus the steps performed to generate a set of Gabor functions are very different from those required to generate a set of K-L functions, although thereafter the functions may be employed similarly.

A further class of functions useful in character recognition and relevant to the invention disclosed and claimed herein are referred to as positive and negative correlative functions ("PNCFs") which encode both pattern and relevance information. These terms are generally understood in the art as follows. The "pattern" of a particular function refers to a fundamental shape useful in recognizing a particular class of characters. Such a pattern function may be implemented mathematically as a two dimensional array, each element corresponding to a pixel of an image of the pattern, and having a "1" or "0" value depending on whether that pixel is within the pattern. Thus, for example, an image of a "pattern" function useful in recognizing the character "5" includes a shape recognizable to the eye as generally corresponding to the shape of a "5". The idea is that substantially all handwritten or printed "5" characters will coincide to a considerable degree with this pattern function. Thus, a complete set of pattern functions for use in recognizing the ten numerals would include at least ten patterns corresponding to the ten digits.

In most cases such a set of patterns would include additional pattern functions reflecting general similarities and differences in the shapes of characters. For example, some individuals connect the top of the two vertical strokes of the number "4", while others write them more nearly parallel. Accordingly, two pattern functions generally corresponding to these two ways of writing a "4" might typically be found in a complete set of pattern functions for recognizing numbers.

A second class of functions useful in recognizing characters are referred as relevance functions. In this case each pixel of a two dimensional array representing a relevance function includes a number representing a gray scale value corresponding to the probability of that particular pixel being present in an image of a character to be recognized. The values of the pixels may be determined by summing the corresponding pixels of images of a large number of test characters. Thus, for example, the pixels corresponding to the most commonly present pixels of characters—e.g., those found in the pattern function for the number "5"—would have relatively high values, corresponding to the pattern information.

Pixels outside those highly-valued pixels would have a zero value in the pattern function, but in the relevance function the values of the less relevant pixels gradually decrease. Accordingly, the value of each bit of a pattern function is binary, that is, either a particular pixel is or is not present in the pattern function corresponding to the image of the character. By comparison, in a relevance function each pixel is assigned a value representative of the probability of that pixel being present in the image of the corresponding character.

Such pattern and relevance functions are known to be useful in identifying characters, by mathematical correlation of the functions with appropriately-scaled images of the characters to be recognized. See commonly assigned copending Ser. No. 07/701,484 filed May 16, 1991 and incorporated by reference herein and now abandoned.

The pattern and relevance information can also be encoded in the negative sense, i.e., the pattern information can be inversely represented to indicate that certain pixels should not be present in an image of the corresponding character, such as the pixels in the outer corners of the image. Similarly, the relevance functions can be inverted, so that the presence of certain pixels in an image counterindicates the identification of the corresponding character. Such negative functions are compared to inverted images of the characters to be recognized.

Previously, comparison of images of characters with such pattern and relevance functions for character recognition has been performed mathematically, by calculating the correlation of each character to be recognized with each of the pattern and relevance functions, such that the maximum correlation calculated identifies the character. See, e.g., U.S. Pat. No. 4,998,286 to Tsujiuchi. See also U.S. Pat. No. 3,182,290 to Rabinow, recognizing that processing time can be saved by treating characters of similar shape (e.g., C's, O's, G's and Q's) similarly insofar as possible, then separately analyzing their distinguishing features; and U.S. Pat. No. 4,783,830 to Johnson et al, showing a pattern-recognizing content addressable memory system for a network of processors.

The present invention relates to a system for carrying out pattern recognition based on comparison of an image of a character to be recognized with positive pattern and positive relevance information, and for comparing an inverse of the image of the character to be recognized with negative pattern and relevance information. As mentioned the functions employed are referred to herein as positive and negative correlative functions (PNCFs). A set of PNCFs will typically include four such functions, both positive and negative pattern and relevance functions, as indicated. Ser. No. 07/701,484 referred to above provides a thorough treatment of mathematical methods of deriving and using such PNCFs. Such methods are also fully discussed in Wilson, "FAUST: A Vision-Based Neural Network Multi-Map Pattern Recognition Architecture", report NISTIR 4805 published by the U.S. Department of Commerce. The present invention is directed to a simpler method of determining and employing such PNCFs.

To complete the discussion of the prior art, Fourier transforms have been employed for image recognition, including character recognition. Fourier transform processing of an image provides a series of coefficients representing the power and relative phase of various frequency components present in the image. Fourier coefficients thus derived encode both frequency and spatial information. However, a complete set of Fourier coefficients may typically include some 1024 coefficients; this large amount of data requires prohibitive amounts of digital processing to yield useful image recognition. Accordingly, the set of coefficients is usually truncated at 32 or 64; consequently much useful information—usually the phase information—is lost, resulting in significant loss of accuracy and utility.

For example, U.S. Pat. No. 4,989,257 to Horowitz discusses application of Fourier transforms for character recognition or similar image processing problems. Horowitz discloses dividing an image of a character into "eight rings and 24 slices" and carrying out "various Fourier transforms, autocorrelations, movement calculations, and sorting operations on the resulting data." See the Abstract. It is self-evident that such a process would require an immense amount of computer time to recognize a single character.

Other functions which have previously been employed for extraction of features from images and related purposes such as character recognition include Walsh functions. Walsh functions are essentially black-and-white "checkerboard" patterns which may be correlated with an image to be characterized. Walsh functions detect "spectral", i.e., frequency information, and may locate a single "topological feature." See U.S. Pat. No. 4,590,608 to Chen et al. The binary—that is, black or white—nature of the Walsh transforms renders their use unduly sensitive to lateral and vertical displacement of the image.

Other patents which may be of interest include U.S. Pat. No. 4,082,431 to Ward, III, showing carrying out Fourier transforms of images using optical holograms and incoherent light; U.S. Pat. No. 3,879,605 to Carl et al, showing a Walsh transform computer implementing Kronecker-matrix transformations; U.S. Pat. No. 5,047,968 to Carrington et al, showing a system for using Fourier transforms to correct distortion in images; and U.S. Pat. No. 5,050,220 to Marsh et al, disclosing an optical fingerprint correlator employing digital Fourier transform techniques to measure the correlation between an unknown print and a sample or known print for characterization purposes.

U.S. Pat. No. 4,854,669 to Birnbach et al discloses a spatial filter with selectible modulation transfer function to remove unwanted portions of an image employing Fourier transform techniques. As indicated above, to obtain accurate image recognition employing Fourier-transform techniques requires that frequency and phase information in the image be preserved. To do so optically requires an apparatus manufactured to high tolerance, employing a coherent light source (e.g., a laser) and a number of costly optical elements. Such systems, as exemplified by Birnbach, are too complex and costly for practical use.

It will be appreciated from review of the above documents that optical techniques have been used to correlate Fourier transforms with characters or other elements of images to be recognized, while digital computers have similarly been used to perform Walsh and Fourier transform filtering. The art does not teach employment of PNCFs, other than in digital systems as described in copending Ser. No. 07/701,484, incorporated herein by reference.

The process of correlating an image of a character to be recognized with a set of PNCFs to yield a set of correlation coefficients, e.g. for input to a neural network, as described in Ser. No. 07/701,484, has always (to the knowledge of the present inventor) been carried out generally according to the following steps. A character to be recognized is identified, e.g., by locating it within a particular box on a form to be converted from hand-printed hard copy to computer data. Each character is digitized by generating an array of bits each responsive to the density of the corresponding pixel in the image. The value of each pixel of the image is then multiplied by the corresponding local value of each of a number of sets of PNCFs, that is, by the corresponding value in a second matrix wherein each element of the matrix represents the local value of one of the PNCFs. The results of all these multiplications (which may be 1,000 or more multiplications per PNCF) are summed to yield a value for the correlation of the image of the character to be recognized with the PNCF. A similar set of calculations is carried out with respect to each of the complete set of PNCFs selected.

The result is a series of coefficients, each representing the correlation of the image of the character with one of the PNCFs. As indicated above, at least one set of four PNCFs is normally generated for each character. Variations in individual styles of writing individual characters—for example, some individuals put a slash through "zero" characters, some put a bar in "seven" characters, and so on—may necessitate two or more sets of PNCFs for each character to be recognized. Hence identification of any character requires the generation of substantial number of coefficients, each corresponding to one of the PNCFs. The coefficients are then supplied as inputs to a neural network. In the neural network the coefficients are weighted in accordance with previously calculated data and summed, yielding a set of output values identifying the character to be identified. These steps, and the step of calculating the weights to be applied to the coefficients, are described in the papers of applicant and co-workers referred to above.

It will be appreciated from the above that the step of correlating an image of a character to be recognized with each PNCF of a large number of sets of PNCFs has heretofore always necessitated a vast number of multiplications and summation of the results to yield the corresponding coefficients. The coefficients thus obtained, each corresponding to the correlation of a single character with one of the PNCFs, are then supplied to a neural network for weighted summation. Such enormous quantities of calculations are optimally carried out on very high speed massively parallel computing systems. While very useful results have been obtained, as shown in the papers of the inventors and co-workers referred to above, such equipment is expensive and likely to remain so for the near term. Moreover, even using state-of-the-art massively parallel computers the analysis of hand printed characters still requires substantial processing time.

It would accordingly be desired to provide a method and apparatus for character recognition realizing the advantages of image processing using PNCFs that could be implemented without costly high speed parallel processing computer equipment.

OBJECTS AND SUMMARY OF THE INVENTION

It is therefore an object of the invention to provide an inexpensively implemented system for recognizing characters employing PNCFs.

The present invention satisfies the above needs of the art and objects of the invention by providing a method and apparatus for recognizing characters using optically implemented PNCFs. The method of the invention includes constructing a neural network for subsequent weighted summing of optical transmission coefficients. Thereafter, according to the method of the invention, patterns of light corresponding to the character to be recognized are transmitted through each of a set of optical elements. Each optical element exhibits varying optical density corresponding to the values of a two-dimensional PNCF. The amount of light passing through each optical element is measured by a single photodetector. The voltages output by the photodetectors, referred to as transmission coefficients, are proportional to the amount of the pattern of light corresponding to the character to be recognized having been transmitted through each of the optical elements implementing the PNCFs. Thus, the transmission coefficients represent optical correlations of the image of the character to be recognized with the PNCFs. The transmission coefficients are supplied in parallel as the inputs to a neural network. The neural network carries out weighted sums of the transmission coefficients, that is, of the outputs of the photodetectors. The output node of the neural network having the highest output voltage identifies the character.

The patterns of light corresponding to the character to be recognized may be generated in any of several different ways. For example, the character can be digitized as generally practiced in the prior art, and individual light emitting diodes of an array can be lit corresponding to the shape of the character. Such arrays could simply be juxtaposed to an optical element, for example, a photographic film having varying optical density corresponding to one of the PNCFs. A set of arrays of light emitting diodes all connected in parallel to driver electronics might be juxtaposed to a set of optical elements implementing each of the PNCFs, to simultaneously illuminate each optical element. A like number of photodetectors would simultaneously detect the amount of light passing through each of the optical elements, and supply corresponding voltages as inputs to a neural network. Such a system would provide a simple and highly robust apparatus for recognizing characters.

Other methods of providing patterns of light corresponding to the image of the character to be recognized might simply employ a video signal to illuminate a display screen juxtaposed to an optical element implementing a PNCF. Indeed, it might be possible optically to project an image of the character directly on an optical element implementing a PNCF. However, in the preferred embodiment, the image of the input character will be digitized prior to illumination of the optical element implementing the PNCF. In this way certain preprocessing steps known to the prior art (e.g., removal of boxes surrounding the characters appearing in the image of the form, character rotation, and so forth) may be conveniently performed.

As indicated generally above, a complete set of PNCFs according to the present invention includes a number of sets of four optical elements, each set normally corresponding to one character to be recognized. More specifically, in a learning mode positive and negative images of each of the test characters are compared to positive and negative interim PNCFs, each encoding pattern or relevance data. If the image of a particular test character correlates well with the data of four arrays implementing the four PNCFs of a particular set, that is, if the four correlation values are relatively great, the test character is assumed to be similar to one of the previously examined characters. The configuration of the test character, to the extent different from the pattern or relevance data represented by the interim PNCFs of the set, may be used to further refine the PNCFs. If the character does not correlate well with any of the sets of interim PNCFs, a new set of four PNCFs is created, consisting of four arrays including data representing positive and negative pattern and relevance information as to that character. At the conclusion of examination of the set of test characters, a number of sets of four PNCFs will have been created. The number of sets will typically include more than the number of digits in the set of test characters, recognizing that there is substantial variation in the manner in which characters are written by individuals.

Analysis of the test characters to derive a complete set of PNCFs is normally performed mathematically. A number of two-dimensional arrays are defined, wherein the elements of each array will ultimately correspond to the pixels in an image of each of the interim PNCFs. Each test character is digitized and compared pixel-by-pixel to the pixels of the "interim" positive pattern and positive relevance PNCFs. That is, the image is correlated with the pattern and reference PNCFs as then existing. The inverse of the image is similarly correlated with "interim" negative pattern and negative relevance PNCFs. Where the correlation is high, the character is deemed to have been recognized; if it is low when compared to all of the PNCFs, a new set of four interim PNCFs is created. The values assigned to "high" and "low" correlations diverge gradually as further test characters are processed. At the end of the process the information stored in each of the arrays can be used to create optical elements implementing the PNCFs.

Optical elements implementing the PNCFs according to the invention may comprise photographic film having a large number of very small dots printed thereon, the density of the dots at each location on the film corresponding to the value of the PNCFs at the corresponding location in the array. As indicated, optical elements implementing the positive and negative pattern information will be either opaque or transparent, while the density of the optical elements implementing the positive and negative relevance functions will vary. Such optical elements can be readily prepared using conventional computer equipment with associated software as used for preparing transparencies of data for projection or the like. Alternatively, active photo-optic elements such as liquid crystal displays and the like might be used to implement the PNCFs, particularly if desired to vary the elements over time. For example, a system including such variable optical elements might be useful for recognition of both hand-printed letters and numbers.

In a first learning modes the system may be operated using known characters to measure transmission coefficients directly. From these the weighting values to be used by the neural network may be determined and the neural network then constructed. Alternatively, the neural network can be constructed using weighting values calculated mathematically according to the papers discussed above. The neural network can be implemented in circuitry by connecting resistors implementing the weighting values between input nodes, intermediate nodes, and output nodes, or mathematically.

BRIEF DESCRIPTION OF THE DRAWINGS

The invention will be better understood if reference is made to the accompanying drawings, in which:

FIG. 1 is a schematic perspective view of an exemplary embodiment of apparatus according to the invention;

FIG. 2 is an idealized representation of four optical elements implementing a set of four PNCFs representing positive and negative pattern and relevance information corresponding to one possible class of images of the character "5";

FIG. 3 is an exemplary flow chart illustrating a self learning method whereby the PNCFs are generated responsive to analysis of a set of test characters; and FIG. 4 is an exemplary flow chart of one method of operating the system of the invention in a learning mode followed by an operating mode.

DESCRIPTION OF THE PREFERRED EMBODIMENTS

As described above, according to the invention patterns of light representative of images of characters to be recognized are transmitted through optical elements implementing PNCFs. The amount of light transmitted from each pattern through the corresponding optical element and detected by a photodetector in effect represents the correlation of the PNCF with the image of the character. According to the invention, the correlation is effectively derived at substantially less cost than if derived using the normal mathematical step of multiplying the value of each pixel of a digitized version of the image by the corresponding local value of a two-dimensional array representing each PNCF.

FIG. 1 shows an exemplary system for carrying out these steps, as well as the subsequent steps in identifying the character via the neural network. Thus, in FIG. 1 a printed form 10 having a number of defined fields 12 is optically scanned. One field 12 having a number of subfields within which users are directed to write individual numerals, such as the numeral "5" shown in subfield 14, is individually scanned as indicated generally at 16. The image is then digitized in a conventional manner, as indicated at 18. It will be appreciated that it might be more convenient to digitize the image of the entire form prior to analysis of individual characters. After digitization, the image may be preprocessed, also in a generally conventional manner, as indicated at 20. Such preprocessing steps may include removal of the boxes around the character, rotation of the character to different positions for separate subsequent analysis according to the apparatus of the invention, scaling and centering the character in the image, and other related and generally known steps. The preprocessed digitized image is supplied to an LED driver 22, that is, a simple switching circuit providing outputs for driving a number of individual LEDs 24 arranged in a set 26 of arrays 28 of LEDs 24. Thus the image of the numeral "5" is represented by a pattern of light emitted by the individual LEDs 24 of each array 28 of LEDs in the set 26 of arrays 28.

More particularly, according to one aspect of the invention, the image of the character to be recognized is compared optically to positive pattern and relevance functions (see FIGS. 2(a) and (b)) while an inverted image of the character is compared to negative pattern and relevance functions (FIGS. 2(c) and (d)). Accordingly, the LED driver's output signal is inverted in inverters 23 before supply to the arrays 28 juxtaposed to the optical elements implementing the negative pattern and relevance functions.

In a preferred embodiment of the invention, the patterns of light corresponding to the positive and inverted image of the character to be recognized may be transmitted simultaneously through each optical element 30 in a set 32 of optical elements. Each optical element 30 exhibits varying optical density corresponding to the value of one of the individual two-dimensional PNCFs. The complete set 32 of optical elements typically includes a number of sets of four optical elements 30, wherein each set of four PNCFs corresponds to one class of recognized character. The invention is not, however, to be so limited.

FIG. 2 illustrates one set of four optical elements 30, in this case implementing four PNCFs corresponding to the numeral 5. FIG. 2(a) represents an optical element implementing the positive pattern function P. That is, the density of each portion of the optical element of FIG. 2(a) is either transparent or opaque, depending on whether the corresponding pixel of the array used to collect the pattern information during generation of the PNCF is valued at "1" or "0".

The optical element of FIG. 2(b) implements the positive relevance R>0 of the character. Thus, the gray-scale density of each section of the optical element of FIG. 2(b) corresponds to the value of a corresponding entry in a two-dimensional array used to store sums of the corresponding pixel values determined in the generation of the PNCF.

The optical element of FIG. 2 (c) implements the negative pattern information ~P. ~P is not the precise mathematical inverse $\bar{P}$ of P, in that ~P includes further informational content; otherwise, there would be no advantage in comparing the image I of a character to be recognized with P and also comparing the inverted image $\bar{I}$ with $\bar{P}$. P may be considered to represent the pixels of a pattern function a substantial number of which must be present in the image I for a positive correlation to be determined; ~P includes pixels which, if present in $\bar{I}$, counterindicate correlation. Physically, for example, the "~5" image, that is, ~P as to the character "5" may typically be somewhat wider than the "5" image of P, as shown. Similarly, the negative relevance information R<0 of FIG. 2(d) is not the exact inverse of R>0, but represents negative correlative information.

The value C of the optical correlation according to the invention of an input image I of a character to be recognized with positive pattern P and positive relevance R>0 functions, together with comparison of the inverse image $\bar{I}$ with the negative pattern ~P and negative relevance R<0 functions, is thus represented by the following equation:

$$C = I \& (P \& (R>O)) \& \bar{I} \& (\text{~}P \& (R<O))$$

As noted, there might well be a second set of four PNCFs corresponding to another method of writing a given character, e.g. in which the tail at the top of a "5" were not in contact with the vertical stroke. Furthermore, the same input character to be recognized may exhibit substantial correlation with several sets of four PNCFs. For example, a "1" may exhibit correlation with PNCFs also well correlated with "4"s and "7"s. As can be seen from FIG. 2 the optical elements 30 are each partially transparent, having varying optical density corresponding to the value of the PNCF at that particular point in the optical element 30. As negative values cannot be represented by a gray scale, both the positive and negative relevance functions of FIGS. 2(b) and 2(d) are implemented by setting zero valued pixels equal to an intermediate gray scale value.

Returning to the discussion of FIG. 1, it will be apparent that the patterns of light emitted by arrays 26 of LEDs 24 will pass varyingly through the different optical elements 30, such that optical correlations of the same pattern of light is simultaneously performed with respect to each of the PNCFs implemented by the set 32 of optical elements 30. The light transmitted through each optical element 30 is collected by a corresponding focusing lens 34, and is represented by the output voltage of a photodetector 36. The output voltages of photodetectors 36, referred to herein as transmission coefficients, are supplied as inputs to input nodes 40 of a neural network 42.

The neural network 42 comprises a number of resistors 50 connected between the input nodes 40, intermediate or "hidden" nodes 44 and 46, and output nodes 48. In effect, the resistors 50 are connected between the various nodes in accordance with weighting data determined during operation of the system in a learning mode. That is, the values of the various resistors 50 indicate the way in which the correlations between the images of the characters and the PNCFs, represented by the transmission coefficients supplied as voltages to the input nodes, can best be combined to yield voltages at the output nodes most definitively identifying the individual characters.

For example, suppose it has been determined during a learning mode of operation that the sets of four PNCFs numbered two, seven and nine of the overall series of PNCFs are particularly useful in identifying the numeral "4". That is, when a pattern of light corresponding to an image of the numeral "4" illuminates each of the optical elements 30, the output voltages provided by the photodetectors 36 will be highest opposite the corresponding sets of optical elements. The input nodes opposite the four PNCFs of a particular set may be connected in a smaller "subnet" connected in turn to a input node of the neural network 42. The function of the neural network 42 is to provide weighted electrical connections between the various input nodes 40 such that the voltages at the output nodes 48 identify the character. More specifically, the effect of connecting the neural network between the input and output nodes is to cause each of the output nodes to exhibit a characteristic voltage level responsive to each image of a character to be recognized. Typically, the neural network is constructed such that the output node corresponding to the character to be identified—in this case, the numeral "4"—exhibits the highest voltage, thus identifying the character to be recognized.

The weighting coefficients implemented by the neural network are calculated responsive to data gathered by comparison of a set of known test characters to optical elements implementing the PNCFs. The calculation of the weighting coefficients may be performed as described in the papers and copending application of the inventors and co-workers described and incorporated by reference above.

Thus the final product of the neural network is a set of voltages present on the output nodes 48 which are compared in an output comparison device 52 to identify the character. Comparison device 52 may be implemented as a so-called winner-take-all circuit as described by Lazzaro et al in "Winner-Take-All Networks of O(N) Complexity", *Advances in Neural Information Processing Systems* 1, Ed. D. S. Touretzky, 1989, pp. 703-711. This paper describes in general neural networks of the kind just described, and is incorporated by reference herein.

It will be appreciated that numerous other methods of providing patterns of light corresponding to the images of characters to be recognized may be employed, including direct projection of the image of the character onto the optical elements implementing the PNCFs. However, to so do would eliminate the advantages of preprocessing provided by digitizing the image. It would also be possible to digitize and preprocess the image and then provide a video signal to each of a number of displays, each illuminating an optical element corresponding to one of the PNCFs.

As noted above, the optical elements 30 can be implemented by photographic film or like media exhibiting density variations corresponding to the value of the two-dimensional PNCFs. Alternatively, active photo-optic elements such as liquid crystal displays, wherein the optical density of the element varies according to an applied signal, might be employed as the optical elements 30.

It will further be appreciated that the individual photodetectors 36 might in some cases desirably be replaced with arrays of photodetectors for individually measuring the correlation between the portions of patterns of light representing images of characters or other images to be recognized and optical elements implementing the PNCFs.

It will also be recognized that the voltages provided by the photodetectors 36 indicative of the transmission coefficients could be measured and used as inputs to a mathematically implemented neural network to identify the character, rather than being used as input voltages for a neural network consisting of hardwired resistances, as shown. As noted, connection of the resistances between the input, intermediate and output nodes provide weighted sums of the transmission coefficients; the weighted summing operation could be carried out equally well by computation.

A set of input test characters is used to generate a set of PNCFs as follows. The process commences by establishment of a series of two-dimensional arrays of zero values. A set of test characters is examined to identify functions, that is, to identify characteristics as to which some fraction of the test characters exhibit similarity. Both "pattern" functions, i.e., binary images including pixels in common to some fraction of the characters of the set of test characters, and "relevance" functions, in which the pixels of the image are weighted according to the probability that the particular pixel is included in any one of the test characters, are generated. In this process, a highly robust set of pattern and relevance functions is provided for comparison with input test characters. According to a further embodiment of the invention, each of the function generating processes is also carried out with respect to an inverse of the image of each of the test characters to generate negative pattern and relevance functions. These are subsequently compared with inverted images of the characters to be recognized to provide yet further robustness to the recognition system. Thus, each of the test characters is correlated with at least four interim PNCFs.

Where a test character examined in the process of generating the PNCFs does not correlate well with any of the "interim" PNCFs generated to that point, it is assumed to be the first representative of a class of characters. In this circumstance, the image of that test character defines the initial pattern and relevance functions, and its inverse defines the negative pattern and negative relevance functions, of a new set of four PNCFs, subsequently modified as other similar test characters are processed.

FIG. 3 illustrates the method whereby each of the input test characters is employed in generating the ultimate set of PNCFs. An image of a test character input and digitized at 60 is filtered at 62 to remove obvious artifacts from the image such as dark blotches away from the main body of the character, boxes around the character and the like. At 64 the filtered image of the character is compared to each of the then-existing interim PNCFs. That is, at any stage in the process there are stored a number of two-dimensional digital arrays each comprising entries corresponding to pixels in an image of a single PNCF. Each pixel in the image of the input test characters is compared to each corresponding pixel in each of the arrays corresponding to each of the interim PNCFs to determine the total correlation of each test character with each of the interim PNCFs. The value of this correlation determines whether the input image character is determined to be "like known" at 64, that is, similar to a known character represented by interim PNCFs; a high value of the correlation indicates that the character is very similar to one previously examined. In this case the interim PNCFs stored in the arrays are modified at 66 to take into account new data represented by the new input character. If the correlation is low with respect to each of the stored interim PNCFs, a set of four new interim PNCFs is created as indicated at 68 and is then subsequently used for comparison to other test characters. The processes is repeated as indicated at 70 until all of the input test characters have thus been employed in updating each of the PNCFs, yielding a highly robust set of PNCFs for use in subsequent comparison with characters to be recognized.

FIG. 4 shows a generalized flow chart of the method of the invention implemented such that optical comparison of patterns of light responsive to known characters with optical elements implementing PNCFs is performed in a "learning mode" to calculate the weighting values for weighting the sums subsequently computed by the neural network in recognition of characters. It will be appreciated that the values of the weights for the weighted sums computed in the neural network could equivalently be calculated mathematically, as described in the papers of the present inventors and co-workers described and incorporated by reference above.

Thus, as shown in FIG. 4 the first step 80 in the learning mode is generation of a set of PNCFs, as described above in connection with FIG. 3.

The next step in the learning mode is step 82, wherein a set of optical elements exhibiting varying optical density corresponding to the values of the PNCFs determined in step 80 is constructed. As indicated, step 82 could perhaps most readily be accomplished by employing the calculated values of the PNCFs at each point in the image, and providing small opaque dots of correspondingly varying density on a sheet of transparent media such as photographic film, as illustrated in FIG. 2. As calculated the PNCFs include positive and negative components; as a negative value cannot be represented as a density, an intermediate gray-scale density is set equal to the zero value of the function.

In step 84, a set of test characters, that is, characters exhibiting normal variation in handwriting but of known identity is selected. In step 86 the test characters are digitized generally according to the teachings of the prior art. Step 86 may also include preprocessing as described above if deemed necessary.

In step 88 each of the optical elements constructed in step 82 is illuminated with a light pattern corresponding to the images of each of the test characters. As noted, step 88 can be implemented by lighting LED's in an array in a pattern corresponding to the digitized image of each of the test characters. In step 90 the amount of light transmitted through each of the optical elements upon illumination by the pattern of light corresponding to each test character is measured to generate a set of transmission coefficients equal to the number of PNCFs multiplied by the number of test characters. The images compared to the negative pattern and relevance PNCFs are inverted, as indicated by FIG. 1. In step 92 a neural network is constructed, employing the processes described in the publications referred to above, responsive to the thus-measured correlation of each of the test characters with respect to each of the optical elements implementing the PNCFs.

In a digitally-implemented method of practice of the learning mode, step 82 would typically be replaced by a step of employing the two-dimensional arrays of values, determined in performance of the method of FIG. 3, in which the PNCFs are determined. Steps 88 and 90 would then simply involve mathematical correlation of the image of each test character with each PNCF, that is, multiplying each element in an array representing the image of the test character by the corresponding element in the array representing one of the PNCFs, and summing the results, to yield a value responsive to their respective correlation. The neural network could then be constructed in step 92, as above, with the correlations thus calculated replacing the transmission coefficients measured as above.

If it were desired to manufacture a commercial product implementing the invention, steps 80–90 would typically be performed in the prototype stage, and step 92 would essentially complete manufacture of the device.

In order to identify a particular character in an operational mode, each of the optical elements would be illuminated in step 94 with a light pattern corresponding to the image of the character to be identified. As indicated above in connection with FIG. 1, normally each optical element would be simultaneously illuminated with the identical pattern of light, or the inverted version thereof, corresponding to a single character to be identified.

In step 96 the amount of light transmitted from the pattern through each of the optical elements is measured. In the implementation of FIG. 1, step 96 is performed by the photodetectors 36, each providing an output voltage indicative of the corresponding transmission coefficient.

In step 98, the transmission coefficients are supplied to the neural network; again, in the implementation of FIG. 1, the transmission coefficients are the output voltages provided by the photodetectors 56. Resistors 50 thus carry out a large number of weighted summations of the transmission coefficients; that is, varying amounts of current are conducted through the resistors implementing the neural network, such that one of the output nodes 48 has the highest voltage. Finally, in step 100 the output node 48 at which the highest voltage is present is identified. This output node indicates the identity of the character to be identified. As mentioned, the neural network could be implemented mathematically rather than by a network of resistors; in this case, the transmission coefficients represented by the outputs of photodetectors 36 would be converted to digital values by a set of analog-to-digital converters providing input to mathematical weighting summation process equivalent to the weighted sums provided by the neural network 42.

As indicated above, there are numerous additional modifications and improvements which could be made in the system of the invention. In particular it will be appreciated that the apparatus for practicing the process of the invention described in connection with FIG. 1 is highly schematic, and that numerous other devices for carrying out the method of the invention are considered to be within the scope of the appended claims.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. Method for recognizing characters, comprising the steps of:

generating a set of optical elements corresponding to a limited set of pairs of positive and negative correlative functions (PNCFs), according to the following method:

selecting a set of test characters representative of the characters to be recognized;

digitizing the image of each of the test characters;

performing positive and negative correlations of each character as to pattern and relevance with each of a set of stored interim PNCFs, and obtaining a set of at least four correlation values responsive to said correlations of each character with each of the interim PNCFs;

evaluating said correlation values for each of said characters to determine whether said character resembles character images represented by said interim PNCFs to within a given degree of accuracy;

if so, updating said interim PNCFs according to said performed positive and negative correlations; and if not, storing at least one and up to four additional interim PNCFs responsive to said character for comparison with subsequent characters of said set of test characters; and when each of said set of test characters have been thus correlated with the set of interim PNCFs, employing the finally-updated set of interim PNCFs to generate a set of optical elements, each optical element exhibiting variations in optical density responsive to a corresponding PNCF;

optically comparing a character to be recognized with each of said set of optical elements, wherein each said comparison is performed by transmitting a pattern of light corresponding to an image of the character to be recognized through an optical element and detecting the total amount of light transmitted through the optical element, to yield a set of transmission coefficients equal in number to said optical elements;

supplying said set of transmission coefficients to a neural network; and employing said neural network to compute weighted sums of the transmission coefficients, wherein weights applied to said transmission coefficients in computation of said weighted sums were determined in accordance with previous comparison of known characters with said set of optical elements.

2. The method of claim 1, wherein said step of transmitting a pattern of light through an optical medium is performed by digitizing an image of the character and activating individual elements of an array of light emitting devices corresponding to said digitized image.

3. The method of claim 2, wherein said light emitting devices are light emitting diodes.

4. The method of claim 2, wherein the complete set of optical elements includes a number of sets each comprising four optical elements, corresponding to four PNCFs, one element of each set exhibiting optical density variation corresponding to positive pattern information, to negative pattern information, to positive relevance information, and to negative relevance information.

5. The method of claim 4, wherein an inverted image of a character to be recognized is optically compared to said optical elements corresponding to said negative pattern and negative relevance information.

6. The method of claim 1, wherein said neural network employed for computing weighted sums is a network of resistors connected between nodes of said network, the values of said resistors corresponding to weights for computing said weighted sums.

7. The method of claim 1, wherein each said character is simultaneously compared to each of the optical elements corresponding to said limited set of PNCFs.

8. The method of claim 1, wherein said step of detecting the total amount of light transmitted through the optical element is performed employing a photodetector corresponding to each of said optical elements.

9. A method of operating a system for optical character recognition employing optical comparison of characters to be recognized to a limited set of pairs of positive and negative correlative functions (PNCFs), said sets of PNCFs including functions representing both pattern and relevance information, said method comprising a learning mode and an operating mode, said learning mode comprising the steps of:

constructing a set of varyingly transparent optical elements, each exhibiting variation in optical density corresponding to one of said limited set of PNCFs;

selecting a set of known test characters;

transmitting a pattern of light corresponding to each of said set of test characters through each of said set of optical elements and measuring the amount of each pattern of light transmitted through each set of optical elements, thus determining a set of transmission coefficients corresponding to the transmission of the patterns of light corresponding to each of said set of known test characters through each of said optical elements; and analyzing the set of transmission coefficients to establish weights in a neural network for summing transmission coefficients responsive to subsequent transmission of patterns of light corresponding to characters to be recognized through said set of optical elements; and said operating mode comprising the steps of:

transmitting a pattern of light corresponding to each of said set of characters to be recognized through each of said set of optical elements while measuring the amount of said pattern of light transmitted through each of said set of optical elements, thus determining a set of transmission coefficients responsive to said measurements;

supplying said set of said transmission coefficients corresponding to said character to be recognized to said neural network; and employing said neural network to determine the identity of the character to be recognized.

10. The method of claim 9, wherein said step of transmitting a pattern of light corresponding to a character through an optical element is performed by digitizing an image of the character and activating individual elements of an array of light emitting devices corresponding to said digitized image.

11. The method of claim 10, wherein said light emitting devices are light emitting diodes.

12. The method of claim 9, wherein the complete set of optical elements corresponding to said PNCFs includes a number of sets of four elements, one element of each of said sets of four elements exhibiting optical density variation corresponding to positive pattern information, to negative pattern information, to positive relevance information, and to negative relevance information.

13. The method of claim 9, wherein an inverted image of a character to be recognized is optically compared to said optical representations implemented by said optical elements corresponding to said negative pattern and negative relevance information corresponding to each PNCF.

14. The method of claim 9, wherein said neural network employed for computing weighted sums is a plurality of resistors connected between nodes of said network, the values of said resistors corresponding to said established weights for comparing said weighted sums.

15. The method of claim 9, wherein a pattern of light corresponding to a character to be recognized is simultaneously transmitted through each of the optical elements corresponding to one of said limited set of PNCFs.

16. The method of claim 9, wherein said steps of said learning mode are performed at a time of assembly of said system for optical character recognition.

17. Apparatus for optical identification of characters, comprising:

means for transmitting a pattern of illumination corresponding to the image of an individual character to be identified through a series of optical elements each exhibiting variation in optical density corresponding to one of a predetermined set of pairs of positive and negative correlative functions (PNCFs), said PNCFs including both pattern and relevance information;

means for measuring the amount of light transmitted from each of said patterns through each of said corresponding optical elements, and for generating a transmission coefficient responsive to each said measurement;

a neural network comprising a winner-take-all circuit for computing weighted sums of the transmission coefficients corresponding to the amount of light transmitted by essentially identical patterns of illumination corresponding to each character to be recognized through each of the optical elements; and means for identifying the character to be identified responsive to said weighted summation of the transmission coefficients.

18. The apparatus of claim 17, wherein said neural network comprises a network of resistances connected between input nodes, intermediate nodes and output nodes, whereby voltages corresponding to transmission coefficients at said input nodes are weighted by the values of resistors connected between said input nodes, said intermediate nodes, and said output nodes, and whereby the voltage present on the output nodes is indicative of the identity of the character to be identified.

19. The apparatus of claim 17, wherein said optical elements each comprise a transparent member having a varyingly dense pattern of opaque dots printed thereon to provide varying optical density thereof corresponding to one of said set of PNCFs.

20. Apparatus for optical identification of characters, comprising:

means for transmitting a pattern of illumination corresponding to the image of an individual character to be identified through a series of optical elements each exhibiting variation in optical density corresponding to one of a predetermined set of pairs of positive and negative correlative functions (PNCFs), said PNCFs including both pattern and relevance information;

means for measuring the amount of light transmitted from each of said patterns through each of said optical elements, and for generating a transmission coefficient responsive to each said measurement;

a neural network for computing weighted sums of the transmission coefficients corresponding to the amount of light transmitted by essentially identical patterns of illumination corresponding to each character to be recognized through each of the optical elements; and means for identifying the character to be identified responsive to said weighted summation of the transmission coefficients, wherein the complete set of optical elements corresponding to each PNCF includes a number of sets, each including four elements, the element of each set including elements exhibiting optical density variation corresponding to positive pattern information, to negative pattern information, to positive relevance information, and to negative relevance information.

21. The apparatus of claim 17, further comprising means for digitizing an image of said character, and means for controlling said means for generating a pattern of illumination responsive to the digitized image of said character.

* * * * *

UNITED STATES PATENT AND TRADEMARK OFFICE
CERTIFICATE OF CORRECTION

PATENT NO. : 5,361,311

DATED : November 1, 1994

INVENTOR(S) : Charles L. Wilson

It is certified that error appears in the above-identified patent and that said Letters Patent is hereby corrected as shown below:

```
On the title page, item [54] and column 1:
     In the Title, replace "RECONGITION" with
  --RECOGNITION--;
     in the Second Reference, replace "Daughman" with
  --Daugman--;
```

Signed and Sealed this

Twenty-fourth Day of January, 1995

Attest:

BRUCE LEHMAN

Attesting Officer     Commissioner of Patents and Trademarks